(12) United States Patent
Zawacki et al.

(10) Patent No.: US 9,925,912 B2
(45) Date of Patent: Mar. 27, 2018

(54) EXTERIOR LIGHTING AND OBJECT DETECTION ASSEMBLY

(71) Applicant: GM GLOBAL TECHNOLOGY OPERATIONS LLC, Detroit, MI (US)

(72) Inventors: Jeffrey T. Zawacki, Oxford, MI (US); Jay H. Ovenshire, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 213 days.

(21) Appl. No.: 14/960,637

(22) Filed: Dec. 7, 2015

(65) Prior Publication Data

US 2017/0158111 A1    Jun. 8, 2017

(51) Int. Cl.
| | | |
|---|---|---|
| *B60Q 1/26* | (2006.01) |
| *B60Q 1/00* | (2006.01) |
| *B60Q 1/04* | (2006.01) |
| *G01S 13/04* | (2006.01) |
| *B60Q 1/28* | (2006.01) |
| *F21S 8/10* | (2006.01) |
| *G01S 13/93* | (2006.01) |

(52) U.S. Cl.
CPC ......... *B60Q 1/0023* (2013.01); *B60Q 1/0035* (2013.01); *B60Q 1/0041* (2013.01); *B60Q 1/0466* (2013.01); *B60Q 1/2607* (2013.01); *B60Q 1/28* (2013.01); *F21S 48/1241* (2013.01); *G01S 13/04* (2013.01); *B60Q 2400/30* (2013.01); *G01S 2013/9364* (2013.01); *G01S 2013/9367* (2013.01); *G01S 2013/9396* (2013.01)

(58) Field of Classification Search
CPC .. B60Q 1/0023; B60Q 1/0035; B60Q 1/0466; B60Q 2400/30; G01S 13/04; G01S 2013/9364; G01S 2013/9367; G01S 2013/9396
See application file for complete search history.

(56) References Cited

U.S. PATENT DOCUMENTS

| | | | |
|---|---|---|---|
| 6,380,883 B1 * | 4/2002 | Bell ..................... | B60Q 1/0023 342/70 |
| 6,459,476 B2 * | 10/2002 | Nishimura ........... | B60Q 1/0023 342/74 |
| 8,803,728 B2 * | 8/2014 | Yonemoto ............ | B60Q 1/0023 342/175 |
| 9,688,034 B2 * | 6/2017 | Ovenshire ........ | B29D 11/00403 |

(Continued)

*Primary Examiner* — Peggy Neils
(74) *Attorney, Agent, or Firm* — Quinn IP Law

(57) ABSTRACT

An exterior lighting and object detection assembly for a vehicle operable in an exterior environment that includes an object includes a housing, a first light source, an inner lens, and an object detection device. The first light source is connected to the housing and emits light for a position light function of the vehicle. The inner lens is connected to the housing and has a first portion that receives and reflects the light from the first light source to the exterior environment of the vehicle to provide the position light function. The object detection device is connected to the housing and is operable to detect the object via an electromagnetic energy. The first portion of the inner lens is disposed between the object and the object detection device and is configured to permit the electromagnetic energy to pass through such that the object detection device detects the object.

16 Claims, 3 Drawing Sheets

(56) References Cited

U.S. PATENT DOCUMENTS

| | | | |
|---|---|---|---|
| 2003/0222772 A1* | 12/2003 | Laufer | B60Q 1/0023 340/435 |
| 2008/0180965 A1* | 7/2008 | Nakamura | B60Q 1/0023 362/507 |
| 2016/0083573 A1* | 3/2016 | Berdin | C09K 3/16 252/511 |
| 2016/0097507 A1 | 4/2016 | Ovenshire et al. | |

* cited by examiner

EXTERIOR LIGHTING AND OBJECT DETECTION ASSEMBLY

TECHNICAL FIELD

This disclosure relates to an exterior lighting and object detection assembly.

BACKGROUND

A vehicle typically includes an exterior light assembly, such as a headlamp or a tail lamp, configured to emit light to the exterior of the vehicle. The exterior light assembly may include several different light functions. For example, a headlamp may provide a high and/or low beam for a forward driving function, a Daytime Running Light (DRL) function, a park or position light function, and other light functions. The forward driving function illuminates a roadway ahead of the vehicle to enable the driver to see the roadway in low light conditions. The DRL function provides light to make the vehicle visible to oncoming traffic during daylight. The position light function provides light to make the vehicle visible to oncoming traffic during low light conditions or at night. The vehicle may also include an object detection device configured to detect an object outside of the vehicle.

SUMMARY

An exterior lighting and object detection assembly and a vehicle are provided herein. The exterior lighting and object detection assembly is for a vehicle operable in an exterior environment that includes an object. The exterior lighting and object detection assembly includes a housing, a first light source, an inner lens, and an object detection device. The first light source is connected to the housing and is operable to emit light for a position light function of the vehicle. The inner lens is connected to the housing and has a first portion operable to receive light from the first light source and reflect the light from the first light source to the exterior environment of the vehicle to provide the position light function. The object detection device is connected to the housing and is operable to detect the object in the exterior environment of the vehicle via an electromagnetic energy. The first portion of the inner lens is disposed between the object and the object detection device and is configured to permit the electromagnetic energy to pass through such that the object detection device detects the object in the exterior environment of the vehicle.

In another embodiment, the exterior lighting and object detection assembly includes a housing, a first light source, a second light source, a third light source, an inner lens, an outer lens, and an object detection device. The first light source is connected to the housing and is operable to emit light for a position light function of the vehicle. The second light source is connected to the housing and is operable to emit light for at least one of a Daytime Running Light (DRL), a turn light, a stop light, and a tail light function of the vehicle. The third light source is connected to the housing and is operable to emit light for a forward driving light function of the vehicle. The inner lens is connected to the housing and includes a first portion and a second portion. The first portion of the inner lens is formed from a homogenous mixture of polymethyl methacrylate and polyetheresteramide and is operable to receive light from the first light source and reflect the light from the first light source to the exterior environment of the vehicle to provide the position light function. The second portion of the inner lens is formed from polymethyl methacrylate without any polyetheresteramide and is operable to receive light from the second light source and direct the light to the exterior environment of the vehicle through a light emitting edge of the second portion to provide the at least one of the DRL, the turn light, the stop light, and the tail light function of the vehicle. The outer lens is connected to the housing, is formed from polycarbonate, and is disposed outward of the inner lens to protect the third light source and the inner lens. The object detection device is connected to the housing and is operable to detect the object in the exterior environment of the vehicle via an electromagnetic energy. The first portion of the inner lens is disposed between the object and the object detection device and is configured to permit the electromagnetic energy to pass through such that the object detection device detects the object in the exterior environment of the vehicle.

The vehicle is operable in an exterior environment that includes an object. The vehicle includes a body, a hood, and an exterior lighting and object detection assembly. The body has a front end. The hood is connected to the body and is positioned at the front end. The exterior lighting and object detection assembly is positioned adjacent to the hood and includes a housing, a first light source, an inner lens, and an object detection device. The housing is connected to the body. The first light source is connected to the housing and is operable to emit light for a position light function of the vehicle. The inner lens is connected to the housing and has a first portion operable to receive light from the first light source and reflect the light from the first light source to the exterior environment of the vehicle to provide the position light function. The object detection device is connected to the housing and is operable to detect the object in the exterior environment of the vehicle via an electromagnetic energy. The first portion of the inner lens is disposed between the object and the object detection device and is configured to permit the electromagnetic energy to pass through such that the object detection device detects the object in the exterior environment of the vehicle.

The exterior lighting and object detection assembly and the vehicle disclosed herein provide both exterior lighting and object detection. This disclosure applies to any machine or manufacture, either stationary or mobile, requiring both exterior lighting and object detection. This disclosure applies to any vehicle, including but not limited to cars, trucks, vans, busses, boats, trains, manufacturing vehicles and equipment, construction vehicles and equipment, maintenance vehicles and equipment, and military vehicles and equipment.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
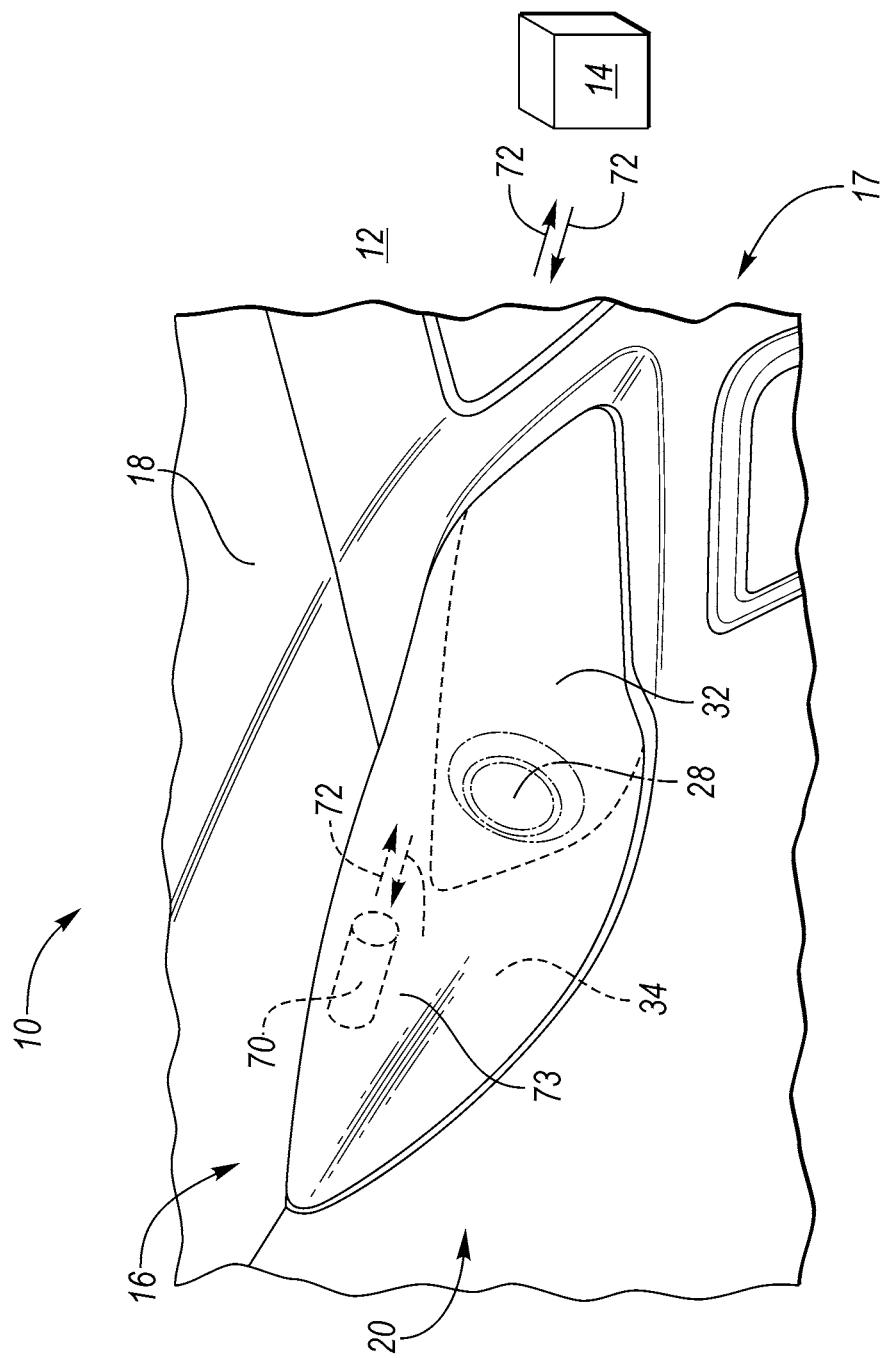
FIG. 1 is a fragmentary, schematic, perspective illustration of a vehicle having an exterior lighting and object detection assembly.

Referring to the drawings, wherein like reference numbers refer to like components throughout the views, FIG. 1 shows a portion of an example vehicle 10. The vehicle 10 is operable in an exterior environment 12. The exterior environment 12 includes one or more objects 14. The vehicle 10 includes a body 16 having a front end 17. A hood 18 is connected to the body 16 and is positioned proximate to the front end 17 of the body 16. The vehicle 10 includes an exterior lighting and object detection assembly 20 of the type disclosed herein.

Figure 2:
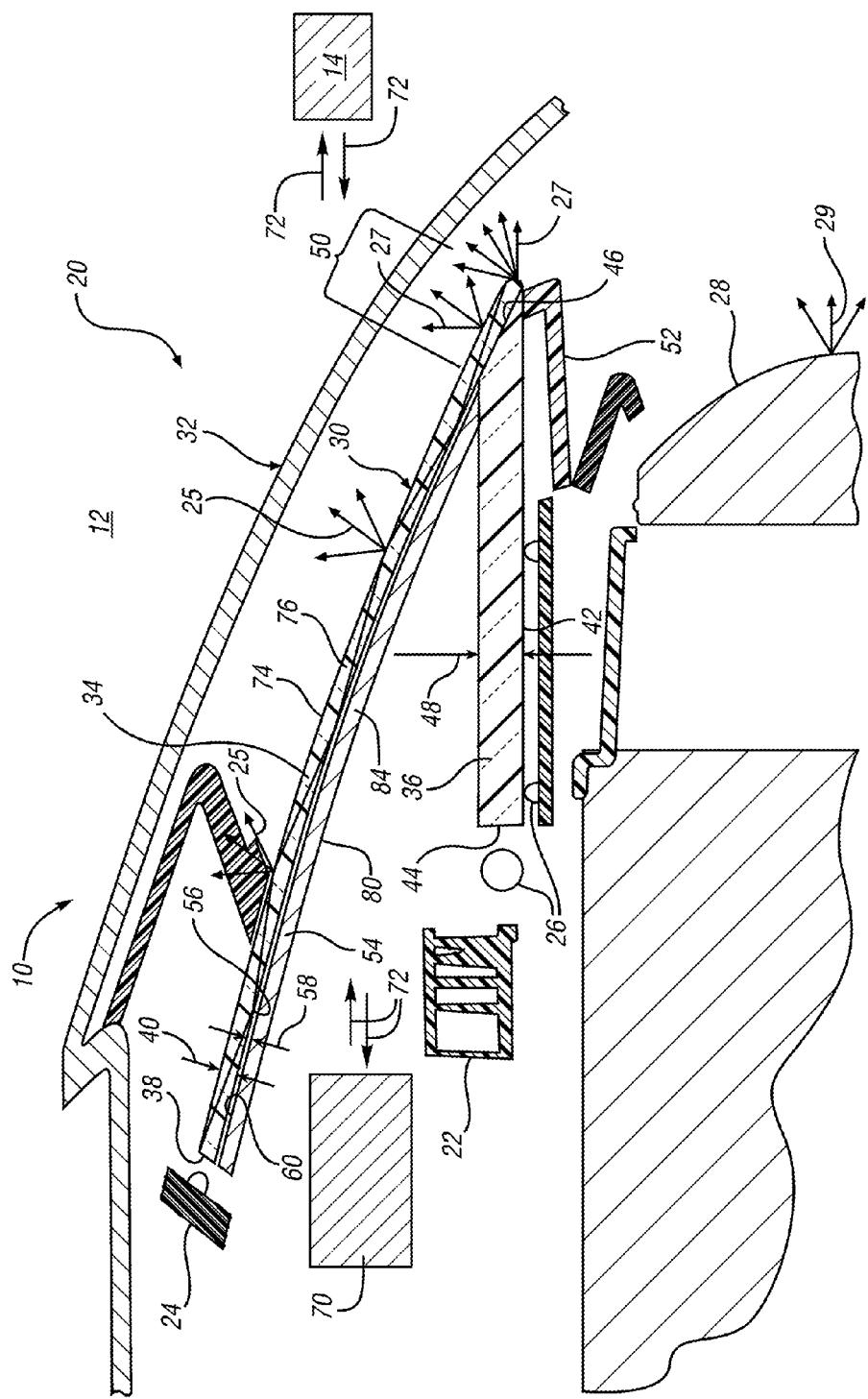
FIG. 2 is a schematic, cross-sectional illustration of the exterior lighting and object detection assembly of FIG. 1.

Referring now to FIGS. 1-2, the exterior lighting and object detection assembly 20 includes an inner lens 30 having a first portion 34 operable to provide a parking or position light (arrow 25) for the vehicle 10, as described in greater detail below. The exterior lighting and object detection assembly 20 may also provide a forward driving light (arrow 29), a Daytime Running Lamp (DRL) light (arrow 27), and/or another exterior light of types well known to those skilled in the art. The exterior lighting and object detection assembly 20 may be connected to the body 16 and may be positioned adjacent to the hood 18, as shown in FIG. 1. Alternatively, the exterior lighting and object detection assembly 20 may be used at other locations of the vehicle 10, for example at the rear end (not shown) of the vehicle 10. The exterior lighting and object detection assembly 20 may be shaped in any desirable fashion to present the desired aesthetic appearance.

While the vehicle 10 of FIG. 1 is a typical example application suitable for the exterior lighting and object detection assembly 20 disclosed herein, the present design is not limited to vehicular applications. Any stationary or mobile, machine or manufacture requiring exterior lighting and object detection may benefit from use of the present design, when properly scaled and configured for the particular application. That is, the exterior lighting and object detection assembly 20 may enjoy use in various single-function or multi-function lighting applications, e.g., in commercial or residential buildings, display illumination, appliance illumination, accent lighting, and any other application in which the disclosed lighting and object detection effects are desirable. For illustrative consistency, the vehicle 10 will be described hereinafter as an example system without limiting use of the exterior lighting and object detection assembly 20 to such an embodiment.

Referring now to FIG. 2, the exterior lighting and object detection assembly 20 includes a housing 22. The housing 22 supports all of the components of the exterior lighting and object detection assembly 20, and is configured for attachment to the body 16 of the vehicle 10. The exterior lighting and object detection assembly 20 further includes a first light source 24 and may include a second light source 26 and a third light source 28. The first light source 24 is operable to emit light for the parking or position light function (arrow 25) of the vehicle 10. The first light source 24 may include one or more LEDs or a light pipe capable of providing the required illumination for the position light function (arrow 25) of the vehicle 10. The second light source 26 may be operable to emit light for the DRL function (arrow 27) of the vehicle 10. Alternatively, the second light source 26 may be operable to emit light for the DRL (arrow 27), a turn light (not shown), a stop light (not shown), a tail light (not shown), and/or another light of the vehicle 10, as understood by those skilled in the art. The second light source 26 may include one or more LEDs or a light pipe capable of providing the required illumination for the DRL (arrow 27), the turn light, the stop light, the tail light, and/or the other light of the vehicle 10. The third light source 28 may be operable to emit light for the forward driving light function (arrow 29) of the vehicle 10. The third light source 28 may include any light source capable of providing the required illumination for the forward driving light function of the vehicle 10.

The exterior lighting and object detection assembly 20 includes the inner lens 30 and may include an outer lens 32. The outer lens 32 may be manufactured from polycarbonate, and may be disposed outward of the inner lens 30 and the third light source 28 to protect the inner lens 30 and the third light source 28 from applied forces (not shown), as well as to seal the forward end of the exterior lighting and object detection assembly 20.

The inner lens 30 receives light from the first light source 24 and may receive light from the second light source 26. The inner lens directs the light outward to provide the position light function and may also provide the DRL function and/or the other light function of the vehicle. The inner lens 30 includes the first portion 34 and may include a second portion 36. The first portion 34 of the inner lens 30 is operable to receive light from the first light source 24 and reflect the light outward to provide the park or position light function. The second portion 36 of the inner lens 30 may be operable to receive light from the second light source 26 and direct the light outward to provide the DRL function and/or the other light function.

The first portion 34 of the inner lens 30 includes a light receiving edge 38 disposed adjacent the first light source 24. Accordingly, the light from the first light source 24 (for the position light function) is introduced into the inner lens 30 along the light receiving edge 38 of the first portion 34 of the inner lens 30. As such, the first portion 34 of the inner lens 30 receives light from the first light source 24 through the light receiving edge 38.

The first portion 34 of the inner lens 30 may include a thickness 40 equal to or greater than 2.0 mm and may be manufactured and formed from a mixture of polymethyl methacrylate (PMMA) and polyetheresteramide (PEEA). The methyl methacrylate copolymer employed in the compositions of the present disclosure may contain a predominant amount, e.g., about 50 to about 90 parts by weight, preferably 50 to 80 parts by weight, of methyl methacrylate and a minor amount, e.g., about 10 to about 50 parts by weight, preferably 20 to 40 parts by weight, of one or more ethylenically unsaturated monomers such as styrene, acrylonitrile, methyl acrylate, ethyl acrylate and mixtures thereof. The ethylenically unsaturated monomer may comprise a mixture of styrene and acrylonitrile or styrene and ethyl acrylate wherein the styrene is present in the copolymer in an amount of about 10 to about 40, preferably 15 to 30, parts by weight and the acrylonitrile is present in the copolymer in an amount of about 5 to about 30, preferably 5 to 20, parts by weight, based on the weight of the copolymer or the ethyl acrylate is present in the copolymer in an amount of about 3 to about 10, preferably 5 to 10 parts by weight, based on the weight of the copolymer.

The methyl methacrylate copolymer may have an average molecular weight of at least about 50,000, e.g., about 100,000 to about 300,000 and a glass transition temperature of at least about 50° C. The methyl methacrylate copolymer may have a refractive index of about 1.50 to about 1.53, preferably 1.51 to 1.52, (as measured in accordance with ASTM D-542).

The multipolymer compositions of the disclosure may also contain an effective amount of a polyetheresteramide to enhance the electrostatic charge dissipation of the copolymer. The polyetheresteramide may have a refractive index within about 0.005 units, preferably within 0.003 units, of the refractive index of the copolymer (as measured in accordance with ASTM D-542). The polyetheresteramide may be present in the amount of about 1 to about 35, preferably 1.5 to 30, wt. %, based on the weight of the composition. The resultant composition, when injection molded into a plaque having a thickness of 0.125 inch, may be such that the plaque exhibits a haze of not greater than about 25%, preferably not greater than 15% (as measured in accordance with ASTM D-1003) and a light transmission of at least about 60%, preferably at least 80% (as measured in accordance with ASTM D-1003).

The polymethyl methacrylate with the polyetheresteramide may be the material Acrylite® LED from Evonik Corporation, which may be used to manufacture the first portion 34 of the inner lens 30. The first portion 34 of the inner lens 30 may appear completely clear or transparent to the human eye when the first light source 24 is turned off and not illuminating the first portion 34 of the inner lens 30.

The light introduced into the first portion 34 of the inner lens 30 from the first light source 24 may diffuse off of the polyetheresteramide dispersed throughout the first portion 34 of the inner lens 30, and is directed outward, away from the vehicle. Because the light from the first light source 24 bounces or reflects off the polyetheresteramide, the first portion 34 of the inner lens 30 provides a fully and/or completely lit signature/entity/function, which produces a homogenous, glowing appearance without the noticeable presence of any light sources behind the inner lens 30.

The second portion 36 of the inner lens 30 may be formed from polymethyl methacrylate, without any polyetheresteramide, i.e., the second portion 36 may be formed from only polymethyl methacrylate, and is characterized by the absence of polyetheresteramide.

The second light source 26 may be disposed adjacent either a light receiving surface 42 of the second portion 36 or adjacent a light receiving edge 44 of the second portion 36. The second portion 36 of the inner lens 30 may include a light emitting edge 46. The second portion 36 of the inner lens 30 directs light from the second light source 26 outward through the light emitting edge 46 of the second portion 36 through total internal reflection. The light emitting edge 46 of the second portion 36 may define a thickness 48 equal to or greater than 2.0 mm. However, the thickness 48 of the second portion 36 of the inner lens 30 may vary from the exemplary embodiment noted above. If the light source is disposed adjacent the light receiving surface 42, then the second portion 36 of the inner lens 30 may be configured to reflect the light and direct the light outward through the light emitting edge 46 of the second portion 36. However, if the second light source 26 is disposed adjacent the light receiving edge 44 of the second portion 36, then the second portion 36 of the inner lens 30 does not need to re-direct or reflect the light, and merely directs the light through the second portion 36 to the light emitting edge 46 of the second portion 36 through total internal reflection.

The light emitting edge 46 may be covered by the first portion 34 of the inner lens 30, such that the light emitted outward from the light emitting edge 46 of the second portion 36 passes through the thickness 40 of the first portion 34 along a segment 50 of the first portion 34 of the inner lens 30. Accordingly, because the light exiting the light emitting edge 46 of the second portion 36 must pass through the first portion 34, the light from the second portion 36 is reflected or diffused by the polyetheresteramide mixed into the polymethyl methacrylate of the segment 50 of the first portion 34 of the inner lens 30. However, because the light from the second portion 36 of the inner lens 30 exits through the relatively small or narrow thickness of the light emitting edge 46 with a relatively high intensity, the light from the second portion 36 only has to pass through the small segment 50 of the first portion 34 of the inner lens 30, and the intensity of the light from the second portion 36 of the inner lens 30 is sufficiently maintained to provide the DRL function and/or the other light function of the vehicle, while providing the same aesthetically pleasing appearance as the position light function. It should be appreciated that the park or position light function and the DRL function and/or the other light function may be operated simultaneously so that the first portion 34 of the inner lens 30 is completely lit when the DRL function and/or the other light function is engaged, while still providing the required light output for the DRL function and/or the other light function.

The exterior lighting and object detection assembly 20 may further include a bezel 52 to trim out the second portion 36 of the inner lens 30, so that the second portion 36 of the inner lens 30 and the second light source 26 are not visible from the outside of the exterior lighting and object detection assembly 20.

As noted above, when the first light source 24 is not lit, the first portion 34 of the inner lens 30 is completely clear and/or transparent to the human eye. This allows for a trim panel 54 to be disposed adjacent to a smooth inner surface 56 of the first portion 34 of the inner lens 30. The trim panel 54 is positioned relative to the first portion 34 of the inner lens 30 to define a gap 58 between a smooth outer surface 60 of the trim panel 54 and the smooth inner surface 56 of the first portion 34. Smooth is defined herein as free from projections, unevenness, roughness, abrupt curves, and/or bends. Preferably, the gap 58 is equal to or greater than 1.0 mm. However, the gap 58 may vary from the exemplary embodiment described herein.

The trim panel 54 may be manufactured from a substrate (not shown) covered by a film layer (not shown) adjacent to the smooth outer surface 60. Accordingly, the substrate supports the film layer. The film layer may be designed to provide any desirable aesthetic appearance to the exterior lighting and object detection assembly 20 that will be visible when the first light source 24 is turned off. For example, the trim panel 54, and more specifically the film layer of the trim panel 54, may include a chrome or some other colored appearance, and may also include a design or emblem fashioned therein. For example, the design may include an emblem, badge, or some other insignia presented on the smooth outer surface 60 of the trim panel 54.

The inner lens 30 may be manufactured from a two shot molding process, such that the first portion 34 and the second portion 36 of the inner lens 30 are integrally connected together, without any visible seams. The inner lens 30 may be manufactured with the two shot molding process because the inner lens 30 and the outer lens 32 are formed from different materials. As noted above, the first portion 34 is manufactured from polymethyl methacrylate with the polyetheresteramide, whereas the second portion 36 may be manufactured from only polymethyl methacrylate, without the polyetheresteramide. The two shot molding process includes molding the first portion 34 from the mixture of polymethyl methacrylate and polyetheresteramide in a mold. When the first portion 34 is cooled and solidified, the mold is adjusted and the second portion 36 of the inner lens 30 is molded onto the first portion 34. As noted above, the second portion 36 may be molded from polymethyl methacrylate without any polyetheresteramide.

The exterior lighting and object detection assembly 20 includes an object detection device 70. The object detection device 70 is connected to the housing 22 and is operable to detect the object 14 in the exterior environment 12 of the vehicle 10 via an electromagnetic energy 72. The object detection device 70 may be disposed is a side light wave portion 73 of the exterior lighting and object detection assembly 20, as shown in FIG. 1 and as understood by those skilled in the art.

Referring again to FIG. 2, the electromagnetic energy 72 used by the object detection device 70 to detect the object 14 may be in a radar wavelength range, a visible light wavelength range, and/or an infrared wavelength range, as understood by those skilled in the art. Any other suitable electromagnetic energy wavelength or wavelength range may be used. The electromagnetic energy 72 may be in the form of a laser. The electromagnetic energy 72 used by the object detection device 70 to detect the object 14 may be a laser electromagnetic energy. The object detection device 70 may both send and receive the electromagnetic energy 72, as shown, for example when the object detection device 70 is configured to use electromagnetic energy in the radar wavelength range. Alternatively, the object detection device 70 may only receive the electromagnetic energy 72, for example when the object detection device 70 is configured to use electromagnetic energy in the visible light wavelength range to detect the object 14. The object detection device 70 may be a radar detecting device, and vision detecting device, a laser detecting device, an infrared detecting device, a sound detecting device, and/or any other suitable detecting device.

In an alternative embodiment, the object detection device 70 may be configured to detect the object 14 via a sound energy (not shown). For example, the sound energy may be a sound energy in an ultrasonic wavelength range, as understood by those skilled in the art. The object detection device 70 may both send and receive the sound energy, The first portion 34 of the inner lens 30 is disposed between the object 14 and the object detection device 70 and is configured to permit the electromagnetic energy 72 to pass through such that the object detection device 70 detects the object 14 in the exterior environment 12 of the vehicle 10. The smooth inner surface 56 of the first portion 34 of the inner lens 30 may be a smooth surface, as shown. The first portion 34 of the inner lens 30 may also include a smooth outer surface 74, as shown, and an electromagnetic energy pass through portion 76. As noted above, smooth is defined herein as free from projections, unevenness, roughness, abrupt curves, and/or bends. The smooth inner surface 56 of the first portion 34 of the inner lens 30 may be substantially parallel to the smooth outer surface 74 of the first portion 34 of the inner lens 30 in the electromagnetic energy pass through portion 76.

The trim panel 54 may be disposed between the object 14 and the object detection device 70 and may be configured to permit the electromagnetic energy 72 to pass through such that the object detection device 70 detects the object 14 in the exterior environment 12 of the vehicle 10. The trim panel 54 may have a smooth inner surface 80, the smooth outer surface 60, and an electromagnetic energy pass through portion 84. The smooth inner surface 80 of the trim panel 54 may be substantially parallel to the smooth outer surface 60 of the trim panel 54 in the electromagnetic energy pass through portion 84 of the trim panel 54. The trim panel 54 may be configured such that the object detection device 70 is not visible from the exterior environment 12 of the vehicle 10.

Figure 3:
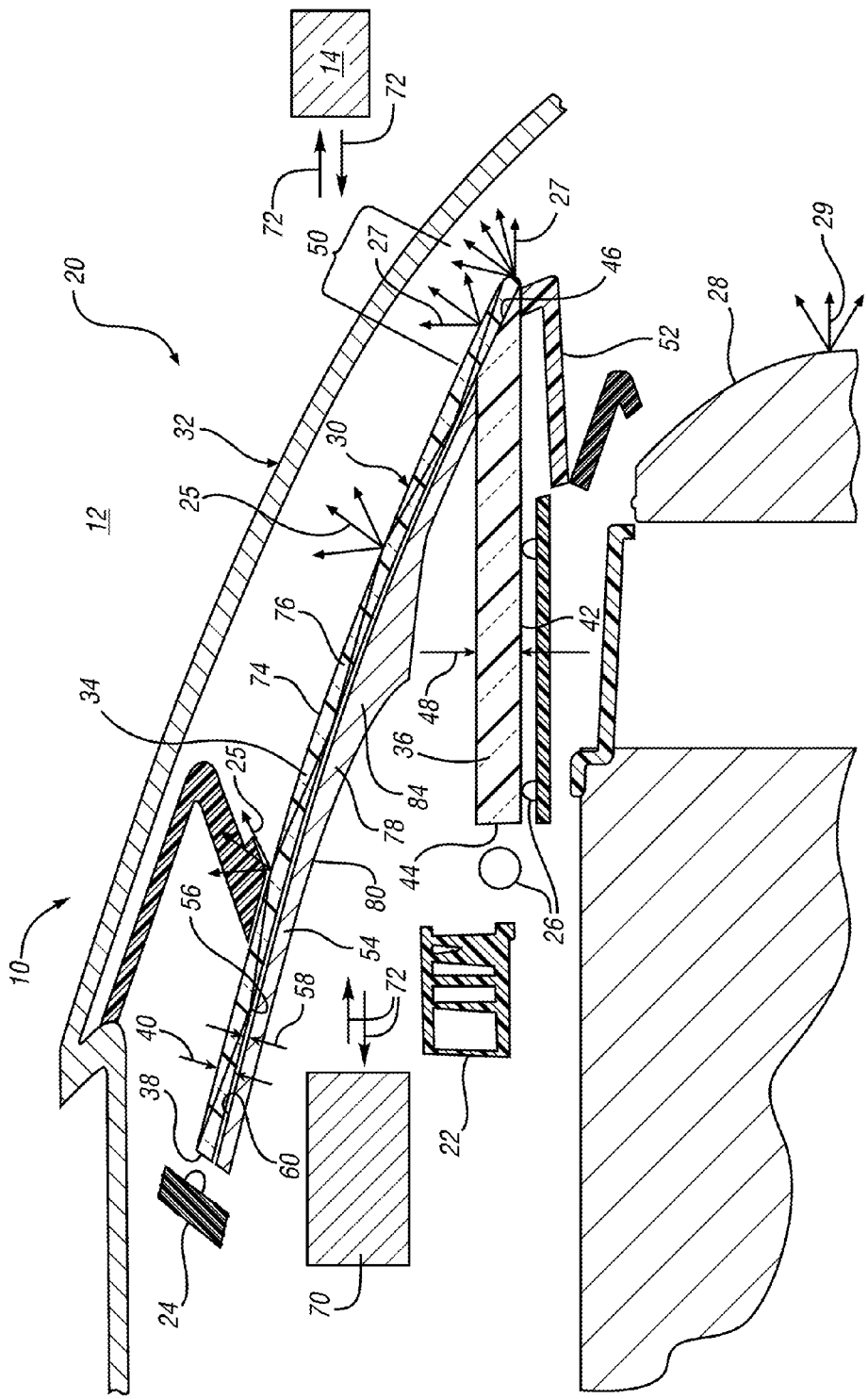
FIG. 3 is a schematic, cross-sectional illustration of the exterior lighting and object detection assembly of FIG. 1, including a correction lens configured to correct for refraction in the exterior lighting and object detection device.

Referring now to FIG. 3, in another embodiment, at least one of the first portion 34 of the inner lens 30 and the trim panel 54 may be configured to form a correction lens 78 in the respective electromagnetic energy pass through portion 76, 84 to correct for refraction of the electromagnetic energy 72 in the exterior lighting and object detection device 20. Refraction of the electromagnetic energy 72 may result from, for example, interaction of the electromagnetic energy 72 with the trim panel 54, the second portion 36 of the inner lens 30, and/or the outer lens 32 of the exterior lighting and object detection assembly 20. At least one of the first portion 34 of the inner lens 30 and the trim panel 54 may be configured to form a correction lens 78 in the respective electromagnetic energy pass through portion 76, 84 to correct for parallax of the object detection device 70, as understood by those skilled in the art.

The smooth inner surface 80 and the smooth outer surface 60 of the trim panel 54 may be configured to form the correction lens 78 in the electromagnetic energy pass through portion 84 of trim panel 54, as shown, to correct for one of refraction of the electromagnetic energy 72 and parallax in the exterior lighting and object detection device 20. The smooth inner surface 56 and the smooth outer surface 74 of the first portion 34 of the inner lens 30 may be configured to form the correction lens 78 in the electromagnetic energy pass through portion 76 of the first portion 34 of the inner lens 30 to correct for one of refraction of the electromagnetic energy 72 and parallax in the exterior lighting and object detection device 20.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An exterior lighting and object detection assembly for a vehicle operable in an exterior environment including an object, comprising:
    a housing;
    a first light source connected to the housing and operable to emit light for a position light function of the vehicle;
    an inner lens connected to the housing and having a first portion operable to receive light from the first light source and reflect the light from the first light source to the exterior environment of the vehicle to provide the position light function; and
    an object detection device connected to the housing and operable to detect the object in the exterior environment of the vehicle via an electromagnetic energy;

wherein the first portion of the inner lens is disposed between the object and the object detection device and configured to permit the electromagnetic energy to pass through such that the object detection device detects the object in the exterior environment of the vehicle;

wherein the first portion of the inner lens has a smooth inner surface, a smooth outer surface, and an electromagnetic energy pass through portion; and wherein at least one of the inner surface and the outer surface of the first portion of the inner lens is configured to form a correction lens in the electromagnetic energy pass through portion of the first portion of the inner lens to correct for refraction of the electromagnetic energy in the exterior lighting and object detection device.

2. The exterior lighting and object detection assembly of claim 1, wherein the first portion of the inner lens is formed from a mixture of polymethyl methacrylate and polyetheresteramide.

3. The exterior lighting and object detection assembly of claim 1, further comprising a trim panel connected to the housing;

wherein the trim panel is disposed adjacent to the inner surface of the first portion of the inner lens.

4. The exterior lighting and object detection assembly of claim 3, wherein the trim panel is configured such that the object detection device is not visible from the exterior environment of the vehicle.

5. The exterior lighting and object detection assembly of claim 3, wherein the trim panel has a smooth inner surface, a smooth outer surface, and an electromagnetic energy pass through portion; and wherein the inner surface of the trim panel is substantially parallel to the outer surface of the trim panel in the electromagnetic energy pass through portion of the trim panel.

6. The exterior lighting and object detection assembly of claim 3, wherein the trim panel has an electromagnetic energy pass through portion; and wherein the trim panel is configured to form a correction lens in the electromagnetic energy pass through portion configured to correct for refraction of the electromagnetic energy in the exterior lighting and object detection device.

7. The exterior lighting and object detection assembly of claim 1, wherein the electromagnetic energy is a radar wavelength electromagnetic energy.

8. The exterior lighting and object detection assembly of claim 1, wherein the electromagnetic energy is a visible wavelength electromagnetic energy.

9. An exterior lighting and object detection assembly for a vehicle operable in an exterior environment including an object, comprising:

a housing;

a first light source connected to the housing and operable to emit light for a position light function of the vehicle;

a second light source connected to the housing and operable to emit light for at least one of a Daytime Running Light (DRL), a turn light, a stop light, and a tail light function of the vehicle;

a third light source connected to the housing and operable to emit light for a forward driving light function of the vehicle;

an inner lens connected to the housing, including:

a first portion formed from a homogenous mixture of polymethyl methacrylate and polyetheresteramide and operable to receive light from the first light source and reflect the light from the first light source to the exterior environment of the vehicle to provide the position light function; and a second portion formed from polymethyl methacrylate without any polyetheresteramide and operable to receive light from the second light source and direct the light to the exterior environment of the vehicle through a light emitting edge of the second portion to provide the at least one of the DRL, the turn light, the stop light, and the tail light function of the vehicle;

an outer lens connected to the housing, formed from polycarbonate, and disposed outward of the inner lens to protect the third light source and the inner lens; and an object detection device connected to the housing and operable to detect the object in the exterior environment of the vehicle via an electromagnetic energy;

wherein the first portion of the inner lens is disposed between the object and the object detection device and configured to permit the electromagnetic energy to pass through such that the object detection device detects the object in the exterior environment of the vehicle.

10. The exterior lighting and object detection assembly of claim 9, further comprising a trim panel connected to the housing;

wherein the first portion of the inner lens has a smooth inner surface; and wherein the trim panel is disposed adjacent to the inner surface of the first portion of the inner lens.

11. The exterior lighting and object detection assembly of claim 10, wherein the trim panel is configured such that the object detection device is not visible from the exterior environment of the vehicle.

12. The exterior lighting and object detection assembly of claim 10, wherein the first portion of the inner lens further has a smooth outer surface and an electromagnetic energy pass through portion;

wherein the trim panel has a smooth inner surface, a smooth outer surface, and an electromagnetic energy pass through portion;

wherein the inner surface of the first portion of the inner lens is substantially parallel to an the outer surface of the first portion of the inner lens in the electromagnetic energy pass through portion of the first portion of the inner lens; and wherein the inner surface of the trim panel is substantially parallel to the outer surface of the trim panel in the electromagnetic energy pass through portion of the trim panel.

13. The exterior lighting and object detection assembly of claim 10, wherein the first portion of the inner lens further has an electromagnetic energy pass through portion;

wherein the trim panel has an electromagnetic energy pass through portion; and wherein at least one of the first portion of the inner lens and the trim panel is configured to form a correction lens in the respective electromagnetic energy pass through portion configured to correct for refraction of the electromagnetic energy in the exterior lighting and object detection device.

14. A vehicle operable in an exterior environment including an object, comprising:

a body having a front end;

a hood connected to the body and positioned at the front end; and an exterior lighting and object detection assembly positioned adjacent to the hood, including:
a housing connected to the body;
a first light source connected to the housing and operable to emit light for a position light function of the vehicle;
an inner lens connected to the housing and having a first portion including a smooth inner surface and an electromagnetic energy pass through portion, the first portion operable to receive light from the first light source and reflect the light from the first light source to the exterior environment of the vehicle to provide the position light function;
a trim panel connected to the housing, disposed adjacent to the inner surface of the first portion of the inner lens, having an electromagnetic energy pass through portion, and configured such that the object detection device is not visible from the exterior environment of the vehicle; and
an object detection device connected to the housing and operable to detect the object in the exterior environment of the vehicle via an electromagnetic energy;
wherein the first portion of the inner lens is disposed between the object and the object detection device and configured to permit the electromagnetic energy to pass through such that the object detection device detects the object in the exterior environment of the vehicle;

wherein at least one of the first portion of the inner lens and the trim panel is configured to form a correction lens in the respective electromagnetic energy pass through portion configured to correct for refraction of the electromagnetic energy in the exterior lighting and object detection device.

15. The vehicle of claim 14, wherein the first portion of the inner lens further has a smooth outer surface;
wherein the trim panel has a smooth inner surface and a smooth outer surface;
wherein the inner surface of the first portion of the inner lens is substantially parallel to the outer surface of the first portion of the inner lens in the electromagnetic energy pass through portion of the first portion of the inner lens; and
wherein the inner surface of the trim panel is substantially parallel to the outer surface of the trim panel in the electromagnetic energy pass through portion of the trim panel.

16. The vehicle of claim 14, wherein the exterior lighting and object detection assembly further includes a side portion;
wherein the object detection device is a radar detecting device disposed in the side portion; and
wherein the electromagnetic energy is a radar wavelength electromagnetic energy.

* * * * *